United States Patent
Lutz et al.

(10) Patent No.: US 7,850,762 B2
(45) Date of Patent: Dec. 14, 2010

(54) METHOD FOR REDUCING EMISSIONS DUE TO GASEOUS DECOMPOSITION PRODUCTS OF AN ELECTROLYTE IN VEHICLES

(75) Inventors: Steffen Lutz, Karlsfeld (DE); Sebastian Scharner, Geltendorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 753 days.

(21) Appl. No.: 11/513,253

(22) Filed: Aug. 31, 2006

(65) Prior Publication Data

US 2007/0053815 A1    Mar. 8, 2007

(30) Foreign Application Priority Data

Sep. 2, 2005    (DE) .................... 10 2005 041 747.7

(51) Int. Cl.
    *B01D 53/02* (2006.01)
(52) U.S. Cl. .................. 95/116; 95/95; 95/104; 95/146; 96/108; 96/143; 96/153; 96/154; 429/100; 429/442; 429/548; 429/29; 429/46
(58) Field of Classification Search .................. 95/104, 95/116, 146, 95; 96/143, 153, 154, 108–221; 429/21, 13, 19, 34, 39, 82, 83, 86; 204/196.08, 204/193, 157.3, 158.2; 205/693, 705
See application file for complete search history.

(56) References Cited

U.S. PATENT DOCUMENTS

| 3,709,735 | A | | 1/1973 | Bonnemay et al. | |
|---|---|---|---|---|---|
| 4,013,522 | A | * | 3/1977 | Nischik et al. | 205/785.5 |
| 5,395,428 | A | * | 3/1995 | von Blucher et al. | 95/104 |
| 2002/0090538 | A1 | * | 7/2002 | Schaefer et al. | 429/13 |
| 2003/0096152 | A1 | * | 5/2003 | Traver | 429/34 |
| 2003/0175494 | A1 | * | 9/2003 | Penneau et al. | 428/304.4 |
| 2007/0017367 | A1 | * | 1/2007 | McElroy et al. | 95/90 |

FOREIGN PATENT DOCUMENTS

| DE | 38 04 722 A1 | 8/1989 |
|---|---|---|
| DE | 41 01 658 A1 | 10/1991 |
| EP | 0 661 094 B1 | 12/1997 |
| WO | WO 01/04573 A1 | 1/2001 |

\* cited by examiner

*Primary Examiner*—Jason M Greene
*Assistant Examiner*—Karla Hawkins
(74) *Attorney, Agent, or Firm*—Crowell & Moring LLP

(57) ABSTRACT

The invention relates to a method for reducing emissions due to gaseous decomposition products of an electrolyte of electrochemical storage devices in a motor vehicle, preferably double-layer capacitors with organic solvents as the electrolyte. According to this invention, the gaseous decomposition products are sent to an activated carbon filter and/or a molecular sieve for deposition of at least a portion of the decomposition products and/or a chemically reactive material and/or a catalytically active material for conversion of at least a portion of the decomposition products. In addition, devices for implementing the inventive method are described.

6 Claims, 3 Drawing Sheets

METHOD FOR REDUCING EMISSIONS DUE TO GASEOUS DECOMPOSITION PRODUCTS OF AN ELECTROLYTE IN VEHICLES

CROSS-REFERENCE TO RELATED APPLICATION

This application claims priority to German patent application Serial No. 10 2005 041 747.7, filed Sep. 2, 2005, the entire disclosure of which is hereby incorporated in its entirety.

BACKGROUND AND SUMMARY OF THE INVENTION

This invention relates to a method for reducing emissions due to gaseous decomposition products of an electrolyte of electrochemical storage devices in a motor vehicle.

Recently, electrochemical storage devices, preferably energy storage devices composed of double-layer capacitors for storing and supplying electric energy, are being used more frequently in motor vehicles. However, some of the liquid electrolytes decompose over the lifetime of these storage devices, forming gaseous decomposition products. This occurs in particular with additional exposure to elevated temperatures, such as those occurring in motor vehicles. The decomposition products are usually collected in the storage device and discharged to the outside through a vent hose. Such a device is disclosed in DE 101 28 672 A1.

However, depending on the type of electrolyte, the resulting gaseous decomposition products may contain a number of elements and compounds that are toxic and/or explosive and/or whose emission is prohibited by law.

To prevent the gaseous decomposition products from entering the environment as emissions, DE 101 28 672 A1, which was cited above, discloses agents that are capable of binding the gaseous decomposition products thereby emitted. These agents may be, for example, absorber materials. However, no further details are discussed.

The object of the present invention is thus to provide an alternative or improved method for reducing emissions due to gaseous decomposition products of an electrolyte of electrochemical storage devices.

The inventive method for reducing emissions due to gaseous decomposition products of an electrolyte of electrochemical storage devices in a motor vehicle, preferably double-layer capacitors having organic solvents as the electrolyte, is characterized in that the gaseous decomposition products are sent to an activated carbon filter and/or a molecular sieve for deposition of at least a portion of the decomposition products.

An activated carbon filter has a carbon structure with a large internal surface area capable of storing a plurality of compounds and elements such as hydrocarbons, nitrites or organic carbonates. The gaseous decomposition products of an electrolyte include, for example, hydrogen ($H_2$), carbon dioxide ($CO_2$), carbon monoxide (CO) and ethylene ($C_2H_2$). If the decomposition products are sent to the activated carbon filter, they are deposited on the porous surface of the activated carbon and therefore do not reach the environment.

In contrast with the activated carbon filter in which the decomposition products are deposited on the surface, molecular sieves are natural or synthetic zeolites having a high absorption capacity for gases, vapors and dissolved substances. Suitable molecular sieves include types 3A, 4A and 5A, for example.

Since the molecular sieve is an absorber material, it may happen that over a period of time this absorber material becomes saturated, i.e., it can no longer absorb any gaseous decomposition products. For this reason, the absorber material should be designed with large enough dimensions to be able to take up the total quantity of decomposition products expected to occur during the lifetime of the vehicle. As an alternative to that, the absorber material may also be replaced as a service measure at certain intervals.

In the embodiment using an activated carbon filter, since the gaseous decomposition products are deposited only at the surface of the activated carbon in an activate carbon filter, the activated carbon filter may advantageously be flushed at predetermined points in time or at predetermined operating points, so that the decomposition products that had been deposited in the activated carbon filter can be sent to the internal combustion engine. In this way, the activated carbon filter is cleaned again of the decomposition products that have already been deposited and it can thus absorb new decomposition products again. The decomposition products sent to the internal combustion engine are incinerated.

A special advantage when using an activated carbon filter as an absorber material is that most new vehicles are currently already equipped with an activated carbon filter for absorbing the gaseous fuel, which is gaseous due to the high temperature. To be able to absorb at least a portion of the decomposition products of the electrolytes of electrochemical storage devices in the motor vehicle, an airtight connecting unit between the electrochemical storage devices and the activated carbon filter for supplying the decomposition products is provided in the motor vehicle. The airtight connecting unit may be, for example, a tube which connects the storage devices either directly to the activated carbon filter or to the airtight connecting unit between the fuel tank and the activated carbon filter. Likewise, when using a molecular sieve as the absorber material, the device includes an airtight connecting unit between the electrochemical storage devices and the molecular sieve.

As an alternative to the inventive method using the aforementioned absorber materials, the second inventive method for reducing emissions due to gaseous decomposition products of an electrolyte of electrochemical storage devices in a motor vehicle, preferably double-layer capacitors having organic solvents as the electrolyte, is characterized in that the decomposition products are sent to a chemically reactive material and/or a catalytically active material for conversion of at least a portion of the decomposition products.

In contrast with the aforementioned absorber materials, in this method the decomposition products are not absorbed but instead are converted or split, forming compounds that are of little or no harm to the environment. The amount of the chemically reactive material used must be large enough to be able to absorb the expected total amount of decomposition products that will occur during the lifetime of the vehicle. As an alternative to this, the chemically reactive material may also be replaced as a service measure.

Copper oxide is advantageously used as the chemically reactive material.

In contrast with a chemically reactive material such as copper oxide, which enters into the conversion of the decomposition products, the catalytically active material does not enter into the reaction but instead accelerates the reaction by reducing the activation energy. Elements and compounds such as hydrogen that react especially easily may thus be converted even at room temperature. Since the mass flow of decomposition products to be expected is comparatively low, the catalyst may be kept small. Another advantage when using a catalyst is that the temperature increase in the vehicle remains low.

The various inventive methods may advantageously be combined, so that all the decomposition products that occur are absorbed and/or converted almost completely.

Other objects, advantages and novel features of the present invention will become apparent from the following detailed description of the invention when considered in conjunction with the accompanying drawings for example.

DETAILED DESCRIPTION OF THE DRAWINGS

Figure 1:
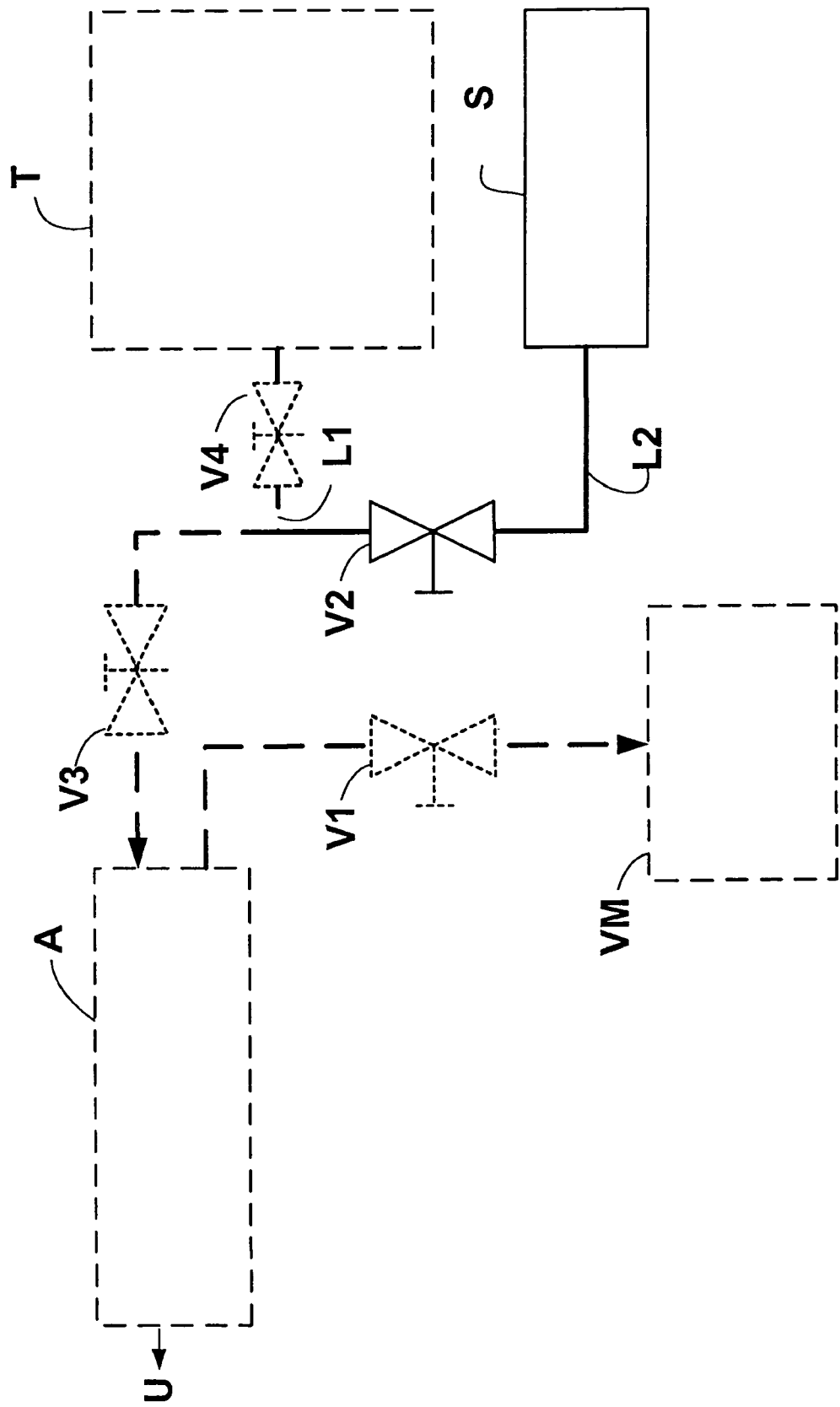
FIG. 1 shows a device for performing the inventive method using an activated carbon filter.

FIG. 1 shows a device for performing the inventive method using an activated carbon filter A, whereby the arrangement of the components shown with dotted lines is already known from the state of the art for motor vehicles having activated carbon filters A.

In new vehicles, the fuel tank T is connected via an airtight connecting unit L1 to an activated carbon filter A. The fuel, which has become gaseous due to the effect of high temperature, for example, is sent to the activated carbon filter A through this airtight connecting unit L1. Most of the gaseous fuel (usually hydrocarbons) is absorbed in the activated carbon filter A. The harmless atoms and molecules then pass through the activated carbon filter into the environment U.

According to the present invention, the electrochemical storage devices S, which are built into an airtight storage unit, are connected to a connecting unit L2, also airtight, by means of the first airtight connecting unit L1, which is provided between the fuel tank T and the activated carbon filter A, so that the gaseous decomposition products also go to the activated carbon filter A, where they can be at least partially absorbed. The airtight connecting units L1 and L2 may advantageously include valves V2, V3 and V4 arranged at various locations, so that the respective connection can be opened or closed, if necessary.

When the vehicle is standing still, the absorbed elements and compounds are bound in the activated carbon filter A. In the driving cycle, the activated carbon filter A is flushed by first closing the valve V3 and opening the valve V1. Air is thus drawn from the environment U through the activated carbon filter A due to the vacuum prevailing in the internal combustion engine VM. The elements and compounds of gaseous fuel and gaseous decomposition products from the electrochemical storage device absorbed by the activated carbon filter A thus enter the internal combustion engine VM, where they are subsequently incinerated. While driving, the activated carbon filter A is flushed at short intervals, so that removal of the elements and compounds is also ensured while driving.

Figure 2:
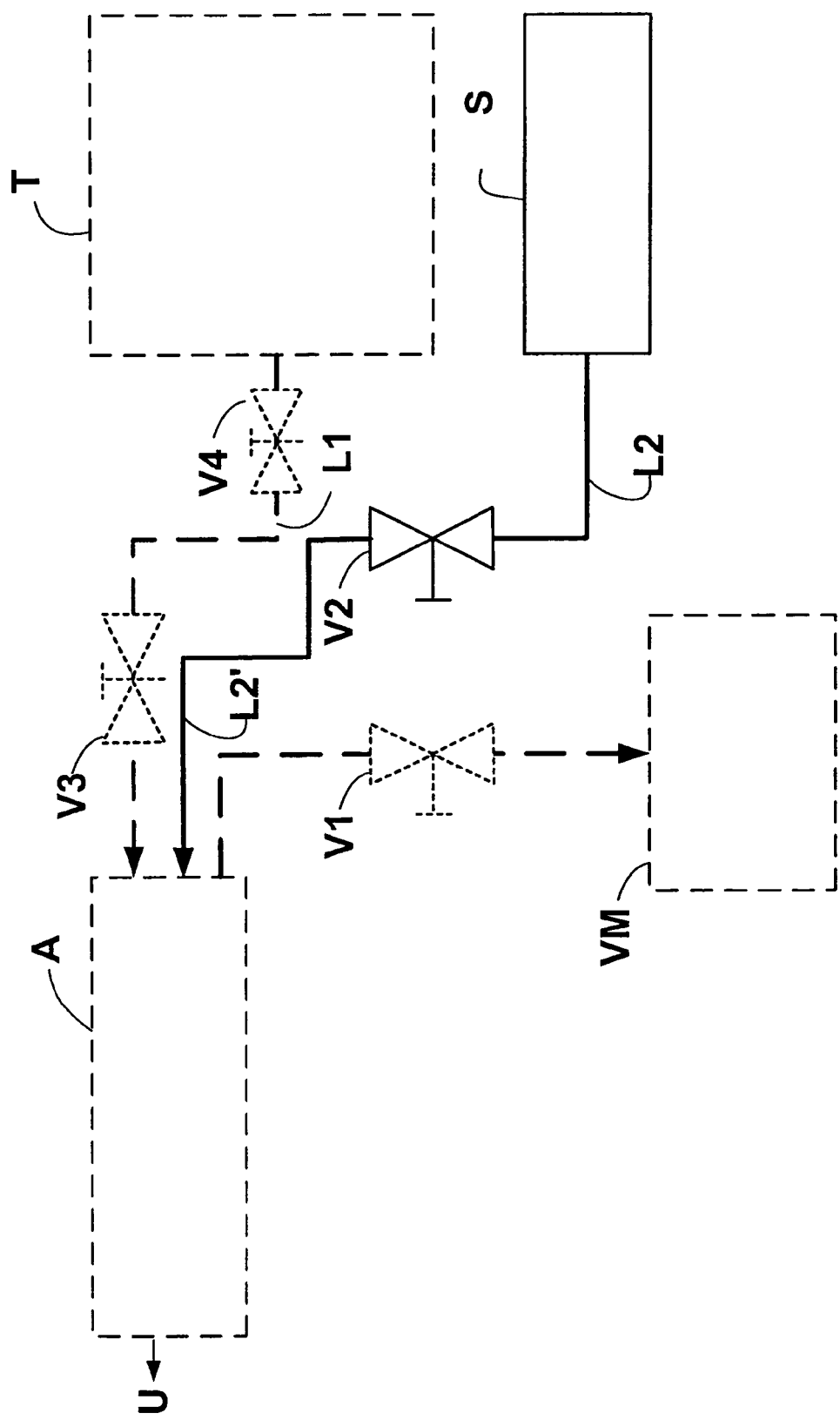
FIG. 2 shows an alternative device for performing the inventive method also using an activated carbon filter.

The alternative device depicted in FIG. 2 differs from the device according to FIG. 1 only in that the second airtight connecting unit L2, which is equipped with valve V2, is not connected to the first airtight connecting unit L1 but instead is connected directly to the activated carbon filter via the alternative second airtight connecting unit L2'. This makes it possible to prevent any gasoline vapors that might be formed from entering the storage device through the connecting lines L1 and L2.

If, instead of the activated carbon filter, which is installed in the vehicle anyway to absorb the gaseous fuel, a molecular sieve and/or a chemically reactive material and/or a catalytically active material is used to reduce emissions due to gaseous decomposition products of an electrolyte, these elements may also be integrated directly into the electrochemical storage device. However, in this case the electrochemical storage device should be hermetically sealed on the outside and the elements used to reduce emissions should be designed to be of sufficient size with regard to the lifetime of the storage device. The advantage is that the airtight connecting lines may be omitted, which could lead to cost savings.

Figure 3:
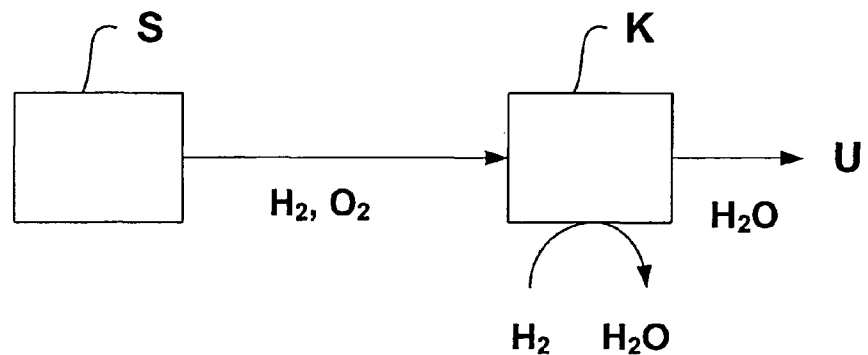
FIG. 3 shows an arrangement for converting the decomposition products by a catalytically active agent.

FIG. 3 shows an arrangement for converting the gaseous decomposition products $H_2$ and $O_2$ of an electrolyte from electrochemical storage devices in a motor vehicle by means of a catalytically active material K.

The decomposition products $H_2$ and $O_2$ formed in the electrochemical storage devices S are passed over a catalytically active material K. This catalytically active material K lowers the activation energy, so the decomposition products $H_2$ and $O_2$ can be converted to $H_2O$ at room temperature. This end product $H_2O$ may be emitted into the environment.

Figure 4:
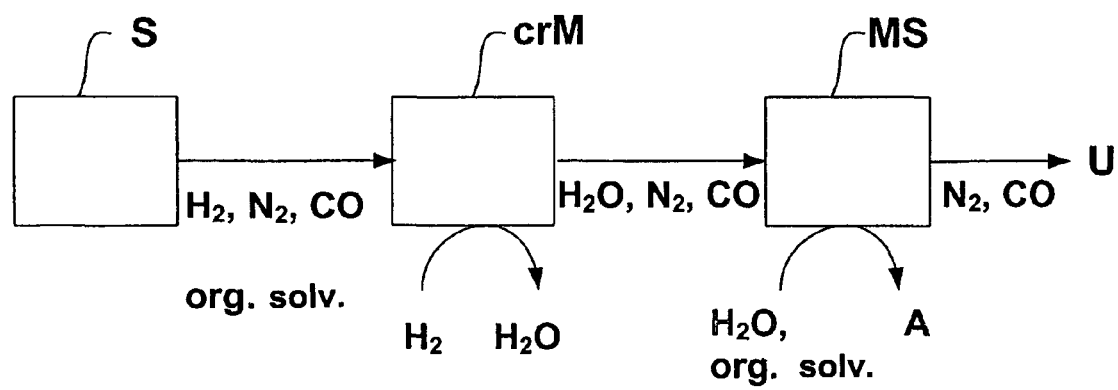
FIG. 4 shows an arrangement for converting and absorbing the decomposition products by means of a chemically reactive molecular and a molecular sieve.

FIG. 4 shows an arrangement which converts and/or absorbs a portion of the decomposition products $H_2$, $N_2$ and CO and the organic solvents org. solv. Through such a combination of the inventive methods, various classes of decomposition products can be retained and/or converted.

The decomposition products $H_2$, $N_2$, CO and the organic solvents org. solv. which are formed in the electrochemical storage devices S are sent in a first step to a chemically reactive material crM, e.g., copper oxide, where hydrogen $H_2$ is oxidized to water $H_2O$ by a chemical reaction, for example. The other decomposition products $N_2$, CO and the organic solvents pass unhindered through the chemically reactive materials crM. In a second step, the other decomposition products $N_2$, CO and the organic solvents as well as the hydrogen $H_2$ that forms water $H_2O$ on incineration are sent to a molecular sieve MS, which absorbs the water $H_2O$ and the organic solvents org. solv., for example. Only the nitrogen $N_2$ and the carbon monoxide CO pass through unhindered and are emitted to the environment U.

Instead of the arrangements depicted here, other arrangements having different chemically reactive materials could be used. It is also possible to use molecular sieves and catalysts that are tailored to the various classes of the decomposition products of the electrochemical storage devices. These chemically reactive materials, molecular sieves and catalysts may also be integrated individually or in combination into an electrochemical storage device without the electrochemical storage device having an outlet line for the decomposition products to the outside. In this case, the amount of chemically reactive materials, molecular sieves and catalysts must be selected so that the decomposition products can be converted and absorbed over the lifetime of the electrochemical storage device.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A method for reducing emissions due to gaseous decomposition products of an electrolyte of electrochemical storage devices in a motor vehicle, the method comprising the acts of:
   generating gaseous decomposition products from the electrolyte;
   providing the generated gaseous decomposition products to at least one absorber material selected from the group consisting of: activated carbon filters and molecular sieves; and
   depositing at least a portion of the generated gaseous decomposition products provided to the at least one absorber material in the at least one absorber material.

2. The method as claimed in claim 1, wherein the electrochemical storage devices comprise double-layer capacitors with organic solvents as the electrolyte.

3. The method as claimed in claim 1, wherein the gaseous decomposition products comprise at least one of the compounds selected from the group consisting of:
   $H_2$, $O_2$, $N_2$, CO, and organic solvents.

4. The method as claimed in claim 1, wherein the at least one absorber material comprises an activated carbon filter and wherein the method further comprises flushing the activated carbon filter, such that the decomposition products deposited in the activated carbon filter are sent to the internal combustion engine.

5. A device for performing the method as claimed in claim 1, wherein the at least one absorber material comprises an activated carbon filter and wherein an airtight connecting line is arranged between the electrochemical storage devices and the activated carbon filter for supplying the decomposition products.

6. A device for performing the method as claimed in claim 4, wherein the at least one absorber material comprises an activated carbon filter and wherein an airtight connecting line is arranged between the electrochemical storage devices and the activated carbon filter for supplying the decomposition products.

* * * * *